June 6, 1967 G. P. A. BATTAIL ET AL 3,324,400

LOW-LEVEL FREQUENCY MODULATED SIGNAL DEMODULATOR

Filed May 12, 1964 4 Sheets-Sheet 1

June 6, 1967 G. P. A. BATTAIL ETAL 3,324,400

LOW-LEVEL FREQUENCY MODULATED SIGNAL DEMODULATOR

Filed May 12, 1964 4 Sheets-Sheet 2

LOW-LEVEL FREQUENCY MODULATED SIGNAL DEMODULATOR

Filed May 12, 1964 4 Sheets-Sheet 3

United States Patent Office 3,324,400

Patented June 6, 1967

3,324,400

LOW-LEVEL FREQUENCY MODULATED SIGNAL DEMODULATOR

Gerard Pierre Adolphe Battail, 30 Blvd. du Temple, Paris, France, and Pierre Claude Brossard, 9 Rue des Fleurs, Montigny-le-Bretonneux, France Filed May 12, 1964, Ser. No. 366,749
Claims priority, application France, Jan. 5, 1963, 937,140; Jan. 21, 1964, 961,085
17 Claims. (Cl. 329—110)

The present invention relates to improvements in the devices described in the co-pending U.S. patent application Ser. No. 264,864, filed Mar. 13, 1963, now Patent No. 3,217,562, issued Nov. 9, 1965, by the present applicants, under the title of "Method and Apparatus for Demodulating Low-Level Frequency Modulated Signals."

It will be reminded that the devices described in the just-mentioned patent application are, generally speaking, low-level frequency modulated signal demodulators including arrangements for the purpose of improving the signal-to-noise ratio. In accordance with these arrangements, the received high frequency signal is applied on one hand to a delay network and therefrom to a first input of a mixer (frequncy changer), and on another hand to the input of a "short-term" frequency spectrum analyzer which delivers at its output a signal hereinafter called, for convenience, the "estimated modulating signal," the amplitude of which is, at any instant, substantially proportional to the average value, for a short time interval immediately preceding the said instant, of the frequency deviation of the said received high frequency signal from its "central" or zero modulation frequency. A second input of the same mixer receives the output wave delivered by a local oscillator, itself frequency modulated by the estimated modulating signal delivered at the output of the analyzer and the central or zero-modulation frequency of which differs from that of the received signal. The mixer is followed by a filter having a comparatively narrow passband, centered on the difference or sum of the above-mentioned central frequencies, and the width of which is substantially twice that of the "base band" occupied by the intelligence signal which modulates the said received signal. The signal delivered at the output of this filter is substequently demodulated in a conventional frequency discriminator and thereafter additively combined with the estimated modulating signal, the latter being either taken directly from the output of the analyzer or obtained by demodulation of the output wave of the local oscillator. The additive combination results into a faithful reconstitution of the original modulating signal, with a substantial reduction of the parasitic modulation due to noise, in comparison with that which would be found at the output of a conventional frequency demodulator, should the received signal be directly applied to the input thereof.

More precisely, it will be reminded that the frequency demodulator which is the object of the above-mentioned co-pending patent application essentially comprises input terminals for receiving a high frequency frequency-modulated signal, the frequency of which varies on either side of a given central frequency in proportion with the amplitude of a modulating signal, the frequency of which covers a base band, a delay network having its input connected with said input terminals, analyzer and estimation circuit means having their input connected with said same said input terminals and the output of which delivers an estimated modulating signal, the amplitude of which is at any instant substantially proportional to the average value of the instantaneous frequency deviation of said high frequency signal from said given central frequency during a short time interval immediately preceding said instant, a local oscillator generating a wave whose frequency is modulated by said estimated modulating signal on either side of a further central frequency differing from above-said central frequency, a frequency changer having two inputs and one output, to the first input of which the output of said delay network is connected and the second input of which receives said frequency modulated wave, a bandpass filter with a narrow passband having its input connected with the output of said frequency changer, and a restitution circuit combining the signal received at the output of said narrow band filter with another signal derived from said estimated modulating signal into a restituted modulating signal; said analyzer and estimation circuit means comprising a plurality of resonators tuned to frequencies staggered in the frequency band covered by said received high frequency signal, means for energizing said resonators from said high frequency signal so as to develop high frequency voltages across said resonators, means for deriving from said high frequency voltages a plurality of rectified direct-current voltages, voltage comparators comparing the values of said rectified voltages and deriving therefrom a plurality of direct-current control voltages, switching means operated from said control voltages and controlling a plurality of further direct-current voltage and deriving therefrom a stepwise-varying signal, and a smoothing filter fed from said stepwise-varying signal and delivering said estimated modulating signal.

In the various devices described in the above-mentioned patent application, the rectified direct-current voltages are derived from the high frequency voltages developed across the resonators by direct rectification of the latter voltages, individually taken. This arrangement does not take in account the phase relations of these high frequency voltages, which nevertheless constitute a coherence element in which the useful signals differ from the noise.

An object of the invention is to take advantage of the just-mentioned relations in such a manner as to obtain a "coherent" estimate of the modulating signal. The advantage of a coherent estimation, as it has just been defined, is that of improving the protection against noise of the operation of the device which delivers the estimated modulated signal, and this more particularly in the transition cases where the amplitudes of the high frequency signals developed across two resonators of neighboring resonance frequencies are substantially equal. When such a condition prevails, the elements of the circuit whose function is to estimate the instantaneous frequency of the incoming signal are, if they directly controlled only from the comparison of the magnitudes of those signals, likely to deliver an indication suddenly jumping from one value to the next one under the effect of a weak additional noise which would slightly alter the balance of the signals.

If, on the contrary, the indication of the instantaneous frequency is made to depend on the comparison of rectified voltages which themselves depend not only on the magnitudes of the high frequency voltages developed across the resonators, but also on their relative phases, such a random effect becomes much less probable. This is what is aimed at according to the present invention.

For this purpose, according to the invention, each of the compared rectified voltages is made to depend on the magnitude of a high frequency voltage developed across a corresponding one of the resonators and at the same time on the relative phase of the latter high frequency voltage with respect to a reference signal having the same frequency and selected according to the result of a previous comparison or, in other words, as a function of the previous value of the instantaneous frequency of the received signal.

Another object of the invention is an improvement in the devices for the restitution of the true modulating signal from its estimate and the output of the narrow band-pass filter, with respect to the embodiments thereof described in the above-mentioned co-pending application. This improvement aims at replacing the addition process of signals at modulating signal frequencies by a mixing process at high frequencies, the main advantage of which resides in its better stability of operation, since it makes it useless to keep at a precise constant value the amplitude ratio of the signals to be added and, consequently, the accurate stabilization of the gains of the circuits delivering such signals.

According to the first-mentioned object of the invention, comparison of the signals issuing from the resonators is effected in the following manner:

A. At the output of each resonator a phase shifter is connected, the function of which is to cause the phases of the signals issuing from two resonators with adjacent resonance frequencies to coincide at a given frequency intermediate the latter resonance frequencies. This given frequency is so selected that the amplitudes of the signals developed across the two considered resonators by a received signal having the said given frequency be substantially equal. A similar condition must be fulfilled for any two resonators having adjacent frequencies and for the phase shifters associated therewith.

B. One of the signals from the resonators, after being phase-shifted as just explained, is selected at any instant as a "reference signal," to which other signals from the phase-shifters associated with the other resonators are compared in a manner taking account of both amplitude and phase. For this purpose, a "synchronous demodulation" process is used, which consists in the mixing, in each one of a plurality of balanced modulators, of the compared signal with the amplified reference signal. The rectified voltages obtained at the output of the modulators are compared with a reference rectified voltage representing the amplitude of the reference signal. The comparisons are made in so-called "voltage comparators" or "amplitude discriminators" each of which corresponds to a different modulator. The reference signal, after being suitably amplified, is applied to the control input (or "carrier-wave" input) of all modulators, while each of the compared high frequency signals is applied to the signal input of a different modulator.

C. As soon as it is found that the amplitude (algebraically measured, i.e. taking both magnitude and polarity in account) of the rectified voltage issuing from any one of the modulators exceeds the reference rectified voltage, an appropriate circuit operated from the outputs of the voltage comparators switches the high frequency phase-shifted signals, to substitute the input signal of the so-determined modulator as a reference signal for the former one. Due to this arrangement, the amplitude of the reference signal always remains higher than the amplitude of the components of the other signals which are in phase with the said reference signal, if one disregards the very short time intervals just preceding the switching instants at which a "decision" is made. These intervals are too short to be of any practical importance. if suitable switching arrangements are adopted.

If the instantaneous frequency of the received high frequency signal is a rather slowly varying one, the phase continuity ensured by the use of the phase shifters makes it possible, for the estimated signal, to closely follow the time variations of this instantaneous frequency and at the same time to benefit the increased protection provided by the coherent nature of the estimation process, since the latter uses synchronous demodulation only.

Concerning the choice of the phase shifts to be introduced by the phase shifters, respectively referred to the resonance frequencies of the associated resonators, it may be assumed, by way of example, that the resonators are just ordinary damped inductance-and-capacitor resonant circuits, whose resonance frequencies are staggered at equal intervals, and whose dampings are so selected that, for a common received high frequency signal applied to all of them, two "adjacent" resonators (i.e. having adjacent resonance frequencies) deliver equal signal amplitudes when the frequency of the received signal lies just in the middle of the interval between their resonance frequencies. It is then easily seen, from the well-known theory of tuned circuits, that if the attenuation of the signal developed across the resonator, with respect to the amplitude it would take if its frequency were one of the resonance frequencies, is taken equal to 3 decibels, a necessary condition for the required phase coincidence between the signals delivered from both resonators through the associated phase shifters is that the respective phase shifts they introduce increase by $\pi/2$ radians (90 degrees) in the lagging direction from each resonator to that having the next higher resonant frequency. More precisely said, if the resonators are given reference numerals by order of increasing resonance frequencies, the phase shift applied to the signal from the $n^{th}$ resonator at its resonance frequency must be equal to that applied to the lowest frequency resonator increased by $(n-1)$ times 90 degrees in the lagging direction.

Referring now to the second above-mentioned object of the invention, the proposed arrangement differs from that described in the above-mentioned co-pending application in that the high frequency wave delivered by the local oscillator and frequency-modulated by the estimated signal is no longer separately demodulated and thereafter added to the demodulated signal derived from the output of the narrow passband filter. The said wave, after being delayed through a suitably dimensioned bandpass filter, is now applied to one of the inputs of a second mixer (frequency changer) the other input of which receives the signal from the output of the narrow band filter following the first mixer. The finally reconstituted modulating signal is obtained from the output of a conventional frequency discriminator, the input of which receives the output of the second mixer, eventually through an additional filter.

The invention will be better understood from the hereafter given detailed description of some of its embodiments and from the annexed drawings, in which.

Figure 1:
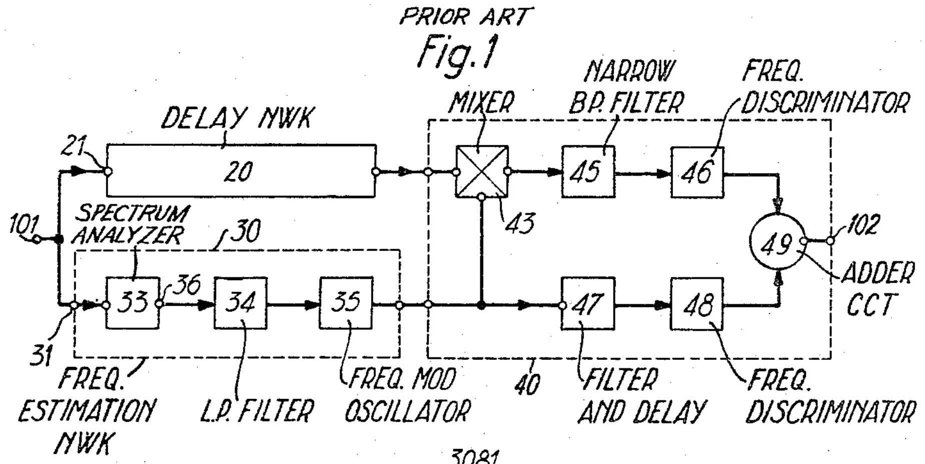
PRIOR ART Fig. 1
FIG. 1 shows in block diagram form a frequency modulated signal demodulator according to the already mentioned co-pending patent application Ser. No. 264,864.

Referring first to FIG. 1, which shows the general arrangement of a frequency modulated signal demodulator according to the above-cited co-pending patent application, the demodulator receives a high frequency signal at its input terminal 101, from which this signal is directed to two parallel paths. On one hand, the high frequency signal is applied to the input 31 of an "estimation network" 30 made up of three parts in cascade connection: a short-term frequency spectrum analyzer 33, of which a new structure is one of the objects of the invention, a low-pass filter 34 for "smoothing" the output signal from 33 (which normally is a stepwise varying signal), and an oscillator 35 adapted to be frequency-modulated by the signal delivered at the output of 34.

On another hand, the high frequency signal received at 31 is also applied to the input 21 of a delay network (delay line) 20. The high frequency signals from delay network 20 and oscillator 35 are respectively applied to one and the other of the two inputs of a mixer 43 which is a part of the assembly 40, which may be called "the demodulator proper." Thereafter the signal from the output of mixer 43 is applied to the input of a comparatively narrow passband filter 45, the bandwidth of which is substantially twice the "base band," i.e. the frequency band covered by the modulating signal. The middle frequency of the passband of 45 substantially coincides with the difference of the central frequencies of the signal received at 101 and of the local oscillator 35.

The wave from the output of filter 45 is demodulated in a conventional frequency discriminator 46. The signal delivered at the output of 46 is not identical with the original modulating signal but is the difference between the latter and the estimated signal received at the output 36 of 33 and filtered through 34. To restitute the complete modulating signal, the estimated signal must be added to this difference signal. This is what is done by deriving the estimated modulating signal from the output of oscillator 35 through the filter 47 and discriminator 48, and by adding the signals from 46 and 48 in the adder circuit 49, at the output of which 102 the desired signal is finally received.

The filter 47 should be so built as to introduce some delay, to compensate for the delay introduced by the narrow band filter 45. Similarly, the main purpose of the delay network 20 is to compensate for the delay necessarily introduced by the operation of the analyzer and frequency estimation network 33, as well as by the smoothing filter 34.

Figure 2:
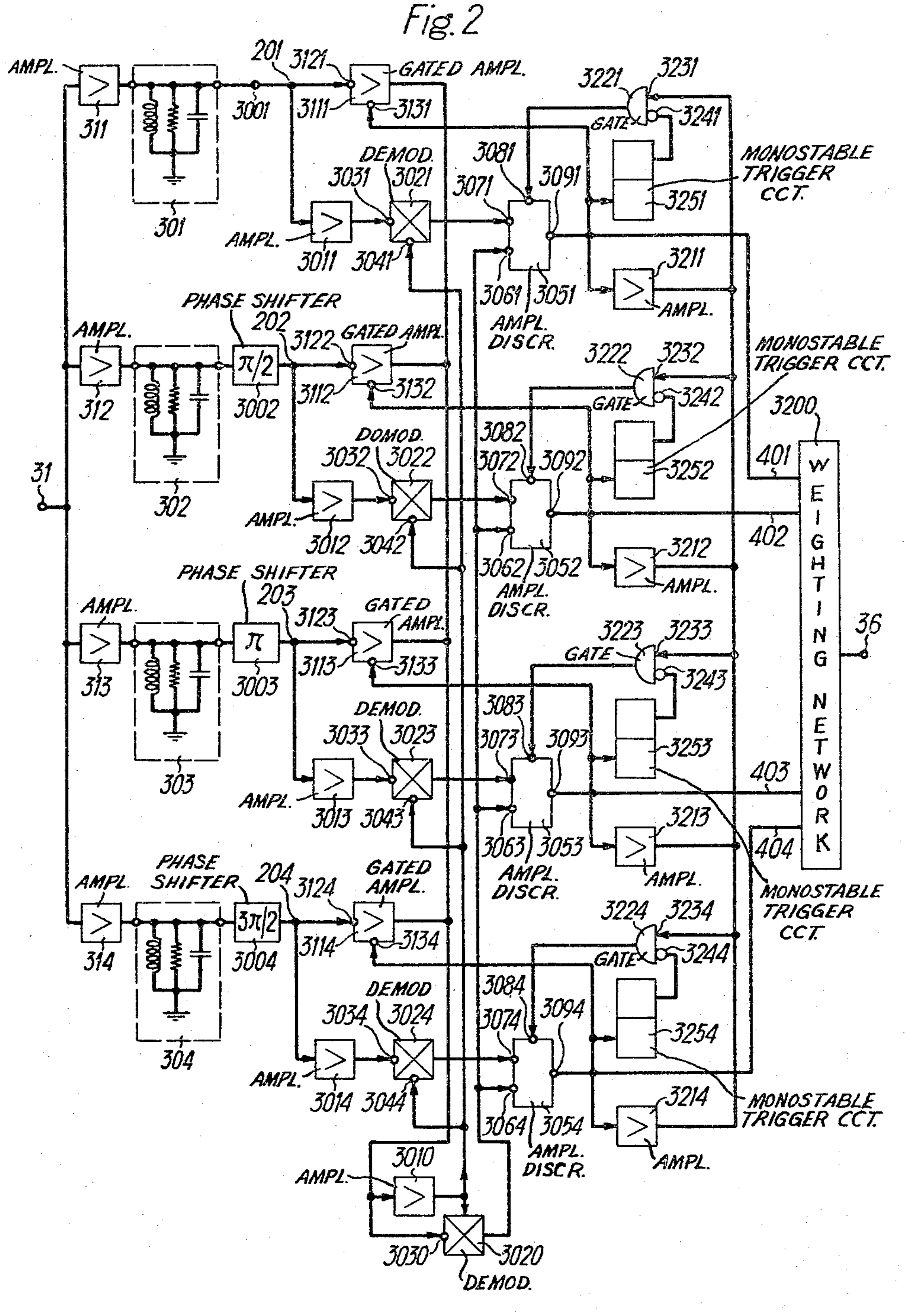
FIG. 2 shows in block diagram form the arrangement of an "estimation network" or short-term frequency analyzer according to the invention.

FIG. 2 shows in block diagram form an embodiment of the analyzer and frequency estimation network 33 of FIG. 1, between points 31 and 36 of the latter. The arrangement of FIG. 2 includes, according to the invention, features taking account of both amplitude and phase of the signals received at the input 101 of the device of FIG. 1. In FIG. 2, to simplify the drawing, it has been assumed that only four resonators 301 to 304 are included in the analyzer. This number, of course, is by no ways limitative, and has been chosen for explanation purposes only. In the cited co-pending patent application Ser. No. 264,-864, means for determining the appropriate number for any given base band width and frequency modulation index have been indicated.

The high frequency signal to be demodulated is received at 31 (FIG. 2) and therefrom directed to the inputs of four amplifiers 311 to 314, which operate as "current injectors," i.e. they have a very high output impedance. At the outputs of these amplifiers, the tuned circuits 301 to 304 are respectively connected. The gains of 311 to 314 are so adjusted that a signal having a given voltage applied at 31 and the frequency of which equals the resonance frequency of any one of the resonators always delivers the same high frequency voltage across this particular resonator. The signal voltages appearing across 301 to 304, respectively, are applied to the inputs of corresponding phase shifting networks 3001 to 3004, the respective phase shifts of which are zero (direct connection), $\pi/2$, $\pi$ and $3\pi/2$ radians (90, 180 and 270 degrees), these phase shift values being in each case referred to the resonance frequency of the associated resonator. The outputs 201 to 204 of the phase shifting networks are connected on one hand with the inputs of amplifiers 3011 to 3014, respectively, and on the other hand with the inputs 3121 to 3124 of further amplifiers 3111 to 3114, respectively, the latter of which are gated amplifiers and, as it will be seen later on, play the part of signal selectors in the building-up of the above-mentioned reference signal. All amplifiers 3011 to 3014 and 3111 to 3114 have identical electrical characteristics, at least when the latter are in their operative condition.

The "synchronous demodulators" 3021 to 3024 are balanced modulators of a conventional type, for instance ring modulators. As it is well known, they are provided with two inputs, one of which, 3031 to 3034 respectively, will be hereinafter designated as "the signal input," and the other, 3041 to 3044 respectively, as "the carrier input." The former inputs generally receive a low-level signal, while the latter receive a comparatively high level carrier wave, which is no other than the already mentioned amplified reference signal.

At the output of each of the demodulators 3021 to 3024, there appears a rectified direct-current voltage, the algebraic value of which is proportional to that component of the input signal which is in phase with the carrier. Since the demodulators must retain the direct-current components of their output signals, they include no output transformer.

The demodulators 3021 to 3024 are identical ones, and all of their carrier inputs 3041 to 3044 are in parallel connection with the output of a carrier amplifier 3010, the part played by which will be explained later on. The outputs of 3021 to 3024 are respectively connected with one of the inputs of an equal number of voltage comparators or "amplitude discriminators" 3051 to 3054, identical with each other.

As it is shown in FIG. 2, the latter amplitude discriminators, the construction of which will be more completely described later on, are provided with three inputs and an output. The first inputs, 3061 to 3064 respectively, receives a common reference voltage, and will be designated as "the reference inputs." The second inputs, 3071 to 3074 respectively, receive the output voltages of the corresponding synchronous demodulators 3021 to 3024 and will be designated as "the comparison inputs." The third inputs, 3081 to 3084 respectively, are "zero resetting inputs." The comparators 3051 to 3054 are so built that their output voltages, received at terminals 3091 to 3094 respectively, can only take one or the other of two constant values, hereinafter called for convenience the "zero" state and the "one" state. The passing from the "zero" to the "one" state takes place when the voltage applied to the comparison input exceeds that applied to the reference input. The application of a short pulse of suitable polarity to the zero resetting input causes the reverse transition. If the output voltage of the comparator already corresponds to the zero state, the short pulse applied to the zero resetting input has no effect at all.

The gated amplifiers 3111 to 3114 are each provided with two inputs, a signal input 3121 to 3124 and a control input 3131 to 3134. The latter inputs are respectively connected with the outputs 3091 to 3094 of the comparators (amplitude discriminators) 3051 to 3054. If the output of such a comparator, 3051 for instance, is in the "one" state, the voltage from this output, applied to the corresponding control input 3131 of the amplifier 3111, causes the latter to become operative and to deliver at its output a signal voltage proportional to that applied to its signal input 3121. If, on the contrary, the output voltage of 3051 is in the "zero" state, it operates as a blocking voltage for amplifier 3111, which ceases to be operative.

The outputs of the gated amplifiers 3111 to 3114 are in parallel connection with each other and also on one hand with the signal inputs of a synchronous demodulator 3020, identical with 3021 to 3024, and, on the other hand, with the input of an auxiliary amplifier 3010, the output of which is fed to all of the carrier inputs 3040 to 3044 of the synchronous demodulators 3020 to 3024.

The output voltage of 3020 is fed to all of the reference inputs of the amplitude discriminators (comparators) 3051 to 3054 and constitutes the reference voltage for the said amplitude discriminators.

The outputs 3091 to 3094 of 3051 to 3054 are respectively connected with:

The control inputs 3131 to 3134 of the gated amplifiers 3114, as already explained;

The inputs of further amplifiers 3211 to 3214. The latter amplifiers include a time-differentiating network followed by a delay network, both of a conventional type. They deliver at their outputs short pulses slightly delayed with respect to the instants when the voltages from 3091 to 3094 applied to their inputs suddenly jump from one of their two possible values to the other. The just-mentioned short delay is so adjusted as to slightly exceed the response time proper of the amplitude discriminators. The outputs of amplifiers 3211 to 3214 are in parallel connection with each other and also with all of the operative inputs 3231 to 3234 of "AND" gates 3221 to 3224, each of which is provided with an operative input and an inhibition input, 3241 to 3244 respectively;

The monostable trigger circuits 3251 to 3254, the outputs of which are respectively connected with the inhibition inputs 3241 to 3244 of gates 3221 to 3224.

The monostable circuits 3251 to 3254, when they are triggered, deliver a pulse which, being not delayed, while the zero resetting impulses are delayed in amplifiers 3211 to 3214, appears at the inhibition output of the concerned one of gates 3221 to 3224 before the zero resetting pulse appears at the operative input of the same gate. Moreover, the pulses delivered by the monostable circuits are given comparatively long duration, which causes their end to occur later than the zero resetting pulse.

Finally, the outputs 401 to 404 of the assembly of the amplitude discriminators 3051 to 3054 are fed to corresponding inputs of a weighting addition network 3200, which delivers at its output 36 (which is the same as point 36 of FIG. 2) a stepwise-varying signal, the amplitude of which depends on the rank of that of the amplitude discriminators 3051 to 3054 which is in the "one" condition at the time considered.

The mode of operation of the device of FIG. 2 will now be analyzed in greater detail. For this purpose it will be assumed that, in the initial condition of the system, the amplitude discriminator 3051 is the only one in the "one" state.

In this case, the only operative gated amplifier is 3111, this under the action of the control signal from 3051 received at its control input 3131; at the output of 3111 there appears a voltage proportional to that received at the output 3001 of resonator 301. The output voltage from amplifier 3111 constitutes the above-mentioned reference signal. This output voltage is applied on one hand to the input of amplifier 3010 and on the other hand to the signal input of the synchronous demodulator 3020. From the output of amplifier 3010, the amplified reference signal is applied to the carrier inputs of all of the synchronous demodulators 3021 to 3024, as well as to the carrier input of 3020. All carrier inputs of such demodulators thus receive, at the time considered, a wave derived from resonator 301 only.

The synchronous demodulator 3020 delivers at its output a rectified voltage proportional to the amplitude of the reference signal. Obviously, this rectified voltage cannot be zero. The same rectified voltage is applied to the reference inputs of all of the amplitude discriminators 3051 to 3054.

The synchronous demodulators 3021 to 3024 deliver at their outputs rectified voltages respectively proportional to the algebraic values of the components of the high frequency voltages applied to their signal inputs which are in phase with the reference signal. The rectified output voltages delivered by 3021 to 3024 are respectively applied to the comparison inputs of the amplitude discriminators 3051 to 3054. The latter thus finally compare the algebraic magnitudes of said components with that of the reference signal.

In such conditions, the wave which appears at point 202 and which is derived from the output of resonator 302, after having been phase shifted in the phase shifter 3002, exhibits, when its frequency increases from an initial value close to the resonance frequency of resonator 301 to a new value closer to the resonance frequency of 302, a component that is in phase with the reference signal. The amplitude of this component increases with the increasing frequency, while the amplitude of the reference signal decreases. Consequently, the rectified voltage which appears at the output of the synchronous demodulator 3022 and which is also applied to the comparison input of 3052 will at some time become higher than the voltage applied to the reference input 3062 of 3052. The output of 3052 will then pass from the "zero" to the "one" state.

It results therefrom that:

Through the differentiating amplifier 3212 and the "AND" gate 3221, the amplitude discriminator 3051 returns to the "zero" state;

The monostable circuit 3252 triggers and blocks the "AND" gate 3222 by means of the voltage applied to its inhibition input 3242. Thus, the pulse delivered by the differentiating amplifier 3212 cannot set 3052 back to the "zero" state; the amplitude discriminator 3052 remains in the "one" state and is the only one in the latter state, at least until frequency changes occurring in the signals received at 31 cause new changes in the condition of some other amplitude discriminators and the return of 3052 to the "zero" state.

The weighting addition network 3200, connected at 401 to 404 with the outputs of all amplitude discriminators 3051 to 3054, is so dimensioned as to deliver at its output 36 (which is the same as point 36 of FIG. 1) a voltage proportional to the rank number of that of the amplitude discriminators 3051 to 3054 which is in the "one" state at the time considered. A stepwise-varying signal thus appears at 36 and, after smoothing in filter 34 (FIG. 1), constitutes the estimated modulating signal.

A practical embodiment of a voltage comparator or amplitude discriminator such as 3051, or any one of 3051 to 3054, will now be described with the aid of FIGS. 3 and 4.

Figure 3:
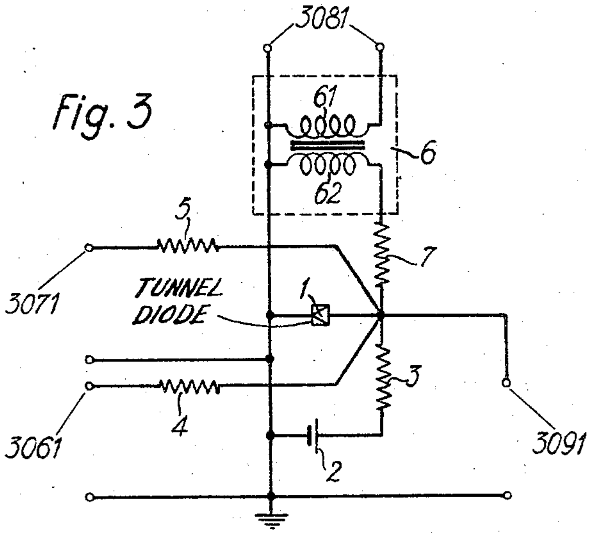
FIG. 3 is the diagram of a voltage comparator used in the device of FIG. 2.

In FIG. 3, a tunnel diode 1 is biased by a direct-current source 2 series-connected through a high resistance 3 across diode 1. The values of the voltage of 2 and of the resistance of 3 are so adjusted that, in its rest condition, the operating point of the diode lies on the part 8 of its voltage-current curve "$i$–$v$" (FIG. 4), not far from the point $V_1$ corresponding to the peak current $i_p$.

One of the terminals of diode 1 is grounded, while its other terminal is connected with:

The reference input terminal 3061 through a high resistance 4. Connections with the synchronous demodulator 3020 (FIG. 2) are so arranged that the reference voltage from the output of 3020 applied to the reference inputs of all amplitude discriminators be, for instance, negative with respect to ground;

The comparison input terminal 3071, through a resistor 5, the value of which equals that of resistor 4. When, for instance, resonator 1 (FIG. 2) is that which delivers the reference signal, the comparison input 3071 receives a positive voltage with respect to ground;

The secondary winding 62 of a transformer 6 through the high resistance 7. The primary winding 61 of 6 is connected with the zero resetting terminals 3081 of the apparatus. The winding directions of 61 and 62 are so arranged that a zero resetting pulse applied to terminals 3081 causes in diode 1 a current, the direction of which is opposed to that of the peak current $i_p$ and the intensity of which exceeds that peak current. This will cause the operating point of diode 1 to return to the part 8 of its curve if it is not already on that part;

The output 3091 of the amplitude discriminator.

Figure 4:
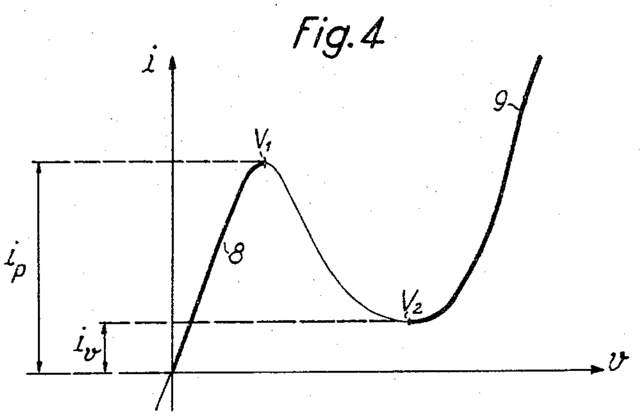
FIG. 4 shows the characteristic voltage-current curve of a tunnel diode used in the device of FIG. 3.

Referring now to FIG. 4, it is seen that, thanks to the choice of the initial operating point, a small change in the positive direction in the intensity of the diode current will cause the operating point to jump to some position on the part 9 of the curve. In other words, the voltage across the diode will jump from a low value to a high one. Thus, if the current caused by the voltage applied to 3071 (FIG.

3) sufficiently exceeds the voltage of opposite polarity applied to the reference input 3061, the operating point will jump, as just explained, from some position corresponding to a voltage $v$ lower than $V_1$ to some other position corresponding to a voltage $v$ higher than $V_2$. If, on the contrary, the voltage applied to 3071 is lower than that applied to 3061, the reverse condition will prevail, and the voltage across 1 will remain lower than $V_1$. This precisely corresponds to the operation of the amplitude discriminators as previously explained, showing that the circuit of FIG. 3 constitutes a sensitive detector for the comparison of the direct-current voltages applied to its reference and comparison inputs.

Figure 5:
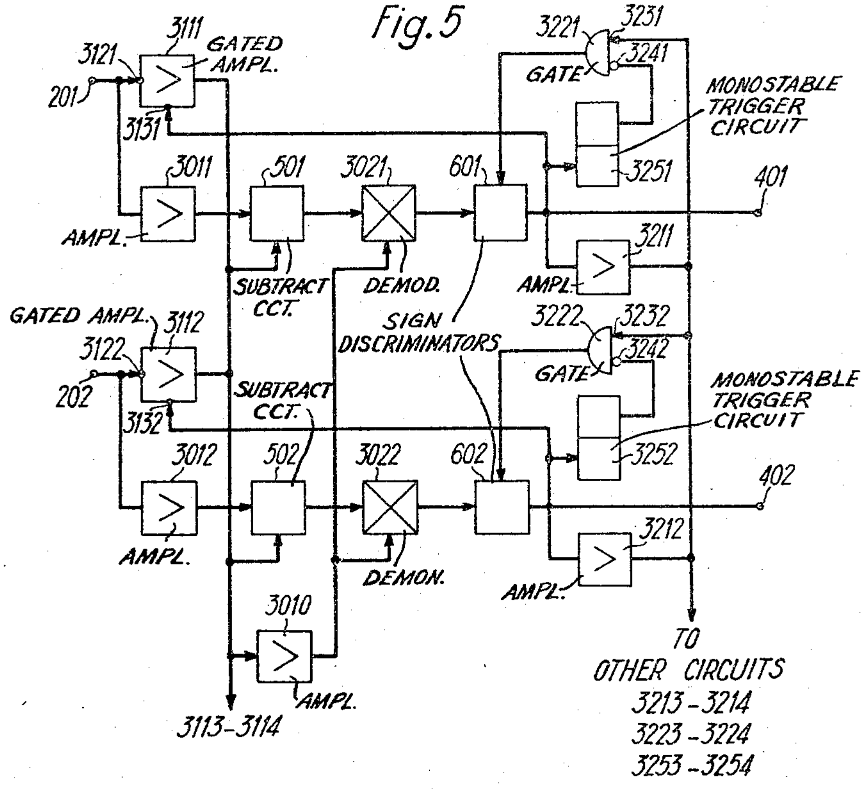
FIG. 5 shows in block diagram form a variant of embodiment of the device of FIG. 2.

Referring now to FIG. 5, this figure shows an alternative arrangement which may be substituted for that of FIG. 2 and is somewhat simpler in some respects. The assembly of the elements shown in FIG. 5 may be substituted for the part of FIG. 2 comprised between points 201 to 204 on one hand, and points 401 to 404 on the other hand. To simplify the drawing, there are shown in FIG. 5 only those parts corresponding to the parts of FIG. 2 associated with resonators 301 and 302; the real circuit of FIG. 5 should, except for the amplifier 3010, which plays the same part as in FIG. 2, include twice the number of elements actually shown. In FIG. 5, the reference signal applied to the carrier inputs of the synchronous demodulators 3021, 3022 is taken, in the same manner as previously explained in the case of FIG. 2, from the common output of the gated amplifiers 3111 and 3112. These amplifiers, when they are operative, that is when they are not "blocked" by a control voltage applied to their control inputs 3131 or 3132, have gains equal to each other and to those of amplifiers 3011 and 3012. Elements 501 and 502 are "subtractor circuits" which effect the vector difference of the high frequency voltages from 3011 and 3111 (or 3012 and 3112) respectively applied to the first and second inputs of each of them. The so obtained vector differences are transmitted from the outputs of 501 and 502 to the inputs of the synchronous demodulators 3021 and 3022, respectively.

At at given instant, one of the gated amplifiers 3111 and 3112, 3111 for instance, will be operative and will deliver through 3010 a common amplified reference signal to the carrier inputs of both 3021 and 3022. Since the signal received at the output of 3111 must have an amplitude equal to that of the signal issuing from 3011 and since, through the previously explained selection procedure of the reference signal, the amplitude of the latter signal must be larger than that of the component of the signal from 3012 which is in phase with that delivered by 3111, the subtractions effected in 501 and 502 will have for their result that no signal at all will be applied to the signal input of 3021, and that the signal applied to the signal input of 3022 will cause a rectified voltage of a defined, for instance negative polarity to appear at the output of 3022.

The rectified voltages delivered by the outputs of 3021, 3022 are applied to the single inputs of the "algebraic sign" or polarity discriminators 601 and 602, respectively. The part played by 601 and 602 is the delivering at their output of a direct-current control voltage taking one or the other of two constant values according to the algebraic sign of the voltage applied to their input. These values will be conventionally designated, as previously, as the "zero" and the "one" state. By the same means 3211, 3251 and 3221 as in the case of FIG. 2, the output voltages of 601 and 602 cause, according to that of their two possible values which they momentarily assume, one or the other of the amplifiers 3111 and 3112 to be selected as the operative one, and the reference signal is selected accordingly. By way of example, in the already considered case where no signal is applied to the input of 3021, the corresponding zero voltage at the input of 601 will cause amplifier 3111 to become the operative one. On the contrary, the negative voltage delivered by 3022 to the input of 602 will cause the blocking of amplifier 3112. If the amplitudes and phases of the high frequency signals appearing at 201 and 202 undergo changes leading to a differing relationship, the sign discriminators 601 and 602 will operate, similarly to what the amplitude discriminators 3051 and 3052 did in the case of FIG. 2, to select as the operative gated amplifier another one than 3111, and so to modify the amplified reference signal delivered at the output of 3010.

The "AND" gates 3221, 3222 deliver to 601 and 602, respectively, zero resetting pulses, in the same conditions and by the same means as the elements with the same reference numerals did in the case of FIG. 2.

In a similar manner, the output voltages of 601 and 602 appear at points 401 and 402, to be combined in a weighting network playing the same part as 3200 in FIG. 2.

Coming now to the second object of the invention, and referring to FIG. 6, the drawing shows how restitution of the true modulating signal in a manner equivalent to the addition of the difference between the latter and the estimated modulating signal may be effected by simpler and more accurate means than those described in connection with FIG. 1.

In the device of FIG. 1, the addition effected is that of demodulated signals, which requires two conventional frequency demodulators with a high degree of linearity, a linear addition network and, further, fairly constant gains in the apparatus feeding the signals to the input of the latter demodulators.

Figure 6:
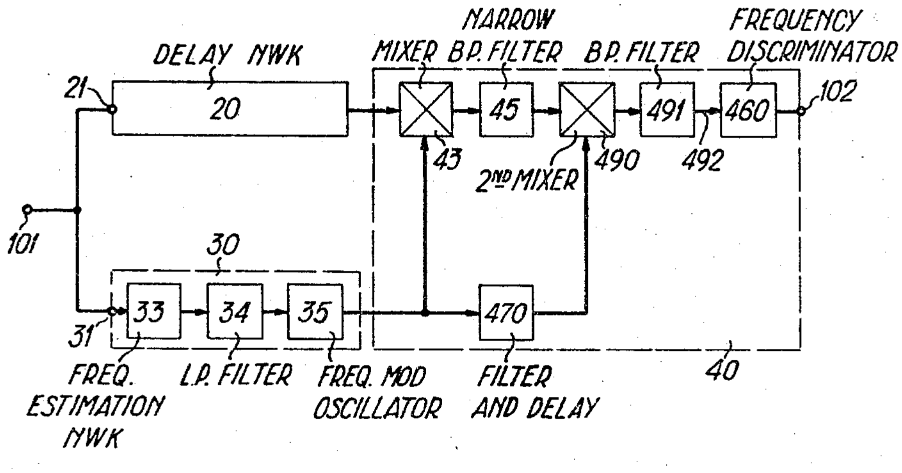
FIG. 6 shows in block diagram form a device for reconstituting the modulating signal from the estimated modulating signal and an additional term, according to a process somewhat differing from that used in the device of FIG. 1.

In the device of FIG. 6, the equivalent operation is effected before the demodulating of the high frequency signals. As a matter of fact, the actual addition is that of frequency deviations representing the modulating signals, which may be carried out by means of a conventional mixer or frequency changer. Keeping at well defined values the amplitudes of the combined signals is thus no longer necessary. After the component signals have been combined into a new frequency-modulated signal, a conventional frequency discriminator operating on the latter will immediately deliver the finally required restituted modulating signal.

The structure of the assembly of FIG. 6 partly includes the same elements as that of FIG. 1. However, the arrangement of FIG. 6 differs from that of FIG. 1 in that the elements and other means providing in FIG. 1 for the reconstitution of the true modulating signal from the signal received at the output of the narrow-band filter 45, found in both FIGS. 1 and 6, are different. They will now be briefly described.

The circuit of FIG. 6 essentially comprises a second mixer 490, one input of which is connected with the output of filter 45 and a second input of which receives the frequency-modulated wave delivered by the local oscillator 35 through an additional filter 470. The latter has a wide passband and is so dimensioned as to introduce a delay practically equal to that of the narrow passband filter 45.

The useful wave which appears at the output of a further filter 491 connected at the output of the second mixer 490 is that which has a central frequency equal to the sum of the frequencies applied to the inputs of said second mixer, if the central frequency of oscillator 35 is chosen lower than that of the signal received at 101. This sum frequency is thus equal to the central frequency of the original high frequency signal. The wave issuing from 491 is frequency-modulated by the true modulating signal and has just to be frequency-demodulated in the conventional way in the frequency discriminator 460, to deliver at 102 the restituted true modulating signal.

The arrangement of FIG. 6 is, generally speaking, very similar to that of FIG. 1 and includes the same delay network, estimation network, local oscillator, mixer and narrow passband filter as the latter, with the same interconnections between them.

In conclusion, the estimated modulating signal appears as an intermediate means which allows temporary separation of the high frequency signal to be demodulated into two parts, one of which occupies but a narrow frequency band and is comparatively insensitive to noise—that issuing from filter 45—and the other, i.e. that delivered at the output of the assembly 30, occupying a wide band but free of additive noise.

Equivalent results (except for a possible inversion of the polarity of the demodulated signal, which could be compensated for in the final discriminator) could also be obtained by taking the central frequency of oscillator 45 higher than that of the signal received at 101, with the passband of filter 45 always centered on the difference frequency, and the passband of filter 491 the same as before, i.e. having a middle frequency equal to the central frequency of the signal received at 101 but this time equal to the difference between the central frequency of the oscillator and that of the latter signal, instead of the sum thereof.

Finally, it must be said that, in the absence of noise, the signal received at 101 (FIG. 6) is identical with that applied to the input 492 of the conventional frequency discriminator 460. Both signals have the same central frequency and are modulated by the same modulating signal, except for a delay. The device of the invention, taken as a whole, operates like a regenerator, the usefulness of which appears in the presence of noise only, and this in the form of a lowering of the threshold of useful operation of the final discriminator 460. This property may be advantageous, for instance, in radio communication systems employing several relays.

It should also be understood that the hereinabove described arrangements are by no ways limitative ones, and that many variants of embodiment of the invention will be obvious to the man skilled in the art. For instance, the resonators of FIG. 2 might be replaced by pairs of coupled tuned circuits completed by suitable phase shifters, or even by more elaborated frequency-selective networks providing at the same time the required amplitude vs. frequency and phase shift characteristics.

What is claimed is:

1. A frequency demodulator for recovering a modulating signal from a high frequency signal frequency-modulated with a frequency deviation from a given central frequency proportional to the instantaneous amplitude of said modulating signal, the frequency of which covers a given base band, comprising a delay network, an estimation network including frequency analyzer means to the input of which said high frequency signal is applied and the output of which delivers at any instant an estimated modulating signal substantially proportional to the average amplitude of said frequency deviation during a short time interval, a local oscillator delivering a wave frequency-modulated by said estimated signal and having a central frequency differing from said given central frequency, a frequency changer having first and second inputs respectively receiving said high frequency signal delayed by said delay network and said wave from said local oscillator, a bandpass filter with a passband narrower than the frequency range covered by said high frequency signal and filtering the frequency-changed signal delivered by said frequency changer, and means for combining said filtered frequency-changed signal with a further signal derived from said estimation network into a restituted modulating signal; said estimation network comprising a plurality of frequency selective phase shifting networks having adjacent passbands staggered in and covering the whole of said frequency range, means for energizing said frequency selective phase shifting networks from said high frequency signal, means for deriving from said last named networks a plurality of frequency-selected signals, and circuit means for deriving from said frequency-selected signals a plurality of rectified voltages; said estimation network further comprising voltage comparators comparing said rectified voltages with a reference direct-current voltage, switching means controlled from said comparators and combining further direct-current voltages into a stepwise varying signal, and a smoothing filter filtering said stepwise varying signal into said estimated signal; said frequency demodulator further comprising a switching circuit controlled from said switching means for selecting at any instant one of said frequency-selected signals as a reference signal, and means for applying a carrier wave proportional to said reference signal to a carrier input in each one of a plurality of demodulators; and said circuit means including connection means for applying each one of said frequency-selected signals to a signal input in one different of said demodulators, and means for applying output voltages delivered by said demodulators as said rectified voltages to said comparators.

2. A frequency demodulator as claimed in claim 1, in which the phase shift introduced by each one of said frequency-selective and phase shifting networks at the middle frequency of its passband of increases with the increasing value of said middle frequency.

3. A frequency demodulator as claimed in claim 2, in which each one of said frequency-selective networks includes a damped inductance and capacitor resonant circuit followed by a phase shifter.

4. A frequency demodulator as claimed in claim 3, in which said resonant circuits have their resonance frequencies staggered at equal intervals in said frequency range, in which the damping of each said resonant circuit is so adjusted as to give it a bandwidth at three-decibel attenuation equal to the common width to said intervals, and in which the phase shift introduced by each phase shifter increases by 90 degrees in the lagging direction from each phase shifter following a resonant circuit having a given resonance frequency to the phase shifter following the resonant circuit having the next higher resonant frequency.

5. A frequency demodulator as claimed in claim 1, in which said narrow bandpass filter has a frequency bandwidth substantially twice that of said base band.

6. A frequency demodulator as claimed in claim 1, in which the middle frequency of the passband of said narrow-band filter substantially coincides with the difference of said central frequencies.

7. A frequency demodulator as claimed in claim 1, in which said switching circuit comprises a plurality of gated amplifiers each controlled from one different of said comparators.

8. A frequency demodulator as claimed in claim 1, in which said connection means consist of amplifiers respectively inserted between each one of said frequency-selective networks and one corresponding of the signal inputs of said demodulators, and in which said reference signal is applied to the signal input of a further demodulator and through an auxiliary amplifier to the carrier input of said further demodulator, the output of which delivers a common reference direct-current voltage to all of said comparators.

9. A frequency demodulator as claimed in claim 1, in which said connection means include a plurality of subtractor circuits each having two inputs respectively fed from said reference signal and from one different of said frequency-selected signals and an output connected to the signal input of one different of said demodulators.

10. A frequency demodulator as claimed in claim 9, in which said reference direct-current voltage is a zero voltage and in which said comparators are voltage polarity discriminators.

11. A frequency demodulator as claimed in claim 9, in which said reference signal is applied to the carrier inputs of all of said demodulators through an auxiliary amplifier.

12. A frequency demodulator as claimed in claim 1, in which each one of said comparators includes a tunnel diode, means for biasing said diode from a direct-current source, first and second terminal pairs for respectively applying to said diode through resistances said reference direct-current voltage and one of said rectified voltages, and a third terminal pair for delivering voltage across said diode as a control voltage to said switching means.

13. A frequency demodulator as claimed in claim 12, further comprising means controlled by said switching means for delivering zero resetting pulses to said diode.

14. A frequency demodulator as claimed in claim 1, in which said switching means for combining said further direct-current voltages into said stepwise varying signal include a weighing network having a plurality of inputs respectively receiving said further direct-current voltages and an output delivering said stepwise varying signal.

15. A frequency demodulator as claimed in claim 1, in which said means for combining said filtered frequency-changed signal from said narrow-band filter with a further signal derived from said estimated signal comprise a further frequency changer having first and second inputs respectively fed from said latter filtered signal and through a further bandpass filter from said wave from said local oscillator, and in which the frequency-changed signal delivered by said second frequency changer is subsequently filtered through further filtering means and thereafter frequency demodulated in a frequency demodulator, the output of which is connected with a utilization circuit.

16. A frequency demodulator as claimed in claim 15, in which said central frequency of said local oscillator is lower than said given central frequency of said high frequency signal, and in which the middle frequency of the passband of said further bandpass filter is substantially equal to the sum of said central frequencies.

17. A frequency demodulator as claimed in claim 15, in which said central frequency of said local oscillator is higher than said given central frequency of said high frequency signal, and in which the middle frequency of the passband of said further bandpass filter is substantially equal to the difference of said central frequencies.

References Cited

UNITED STATES PATENTS

| | | | |
|---|---|---|---|
| 3,044,003 | 7/1962 | Stavis et al. | 329—112 X |
| 3,119,080 | 1/1964 | Watters | 329—205 |
| 3,162,819 | 12/1964 | Wintringham | 329—146 X |
| 3,217,262 | 11/1965 | Battail et al. | 329—110 |

ROY LAKE, *Primary Examiner.*

A. L. BRODY, *Assistant Examiner.*